United States Patent [19]

Hauke et al.

[11] 4,112,472
[45] Sep. 5, 1978

[54] LONGITUDINAL SCAN, CAM SHAPED, TURNTABLE ROTOR FOR MAGNETIC RECORDING

[75] Inventors: Francis Edward Hauke, Boulder; Everette Ray McCully, Erie, both of Colo.; Robert Marion McElroy, Jr., Huntsville, Ala.; Peter Alan Stevenson; Stephen Martin Vogel, both of Boulder, Colo.; John Walton Woods, Longmont, Colo.

[73] Assignee: International Business Machines Corporation, Armonk, N.Y.

[21] Appl. No.: 772,892

[22] Filed: Feb. 28, 1977

[51] Int. Cl.² .................. G11B 15/64; G11B 15/60; G11B 21/04
[52] U.S. Cl. ............................ 360/102; 360/84; 360/130
[58] Field of Search ............... 360/102, 84, 85, 130, 360/101

[56] References Cited

U.S. PATENT DOCUMENTS 4,015,291 3/1977 Stevenson et al. .................. 360/102

Primary Examiner—Robert S. Tupper
Attorney, Agent, or Firm—Joscelyn G. Cockburn

[57] ABSTRACT

In a reel-to-reel longitudinally scanned tape transport or recorder, a length of media is positioned to fly in transducing relationship with a transducing head. The transducing head is mounted on a rotatable turntable rotor. The rotor includes a substantially circular member with concentric horizontal surfaces projecting in separate vertical planes. A cam shaped contour is fabricated on one of the horizontal surfaces with the transducing means positioned at the peak or crown of said cam shaped surface. There is a gradual roll off between the crown and the lowest point of the cam shaped surface. The roll off creates a converging channel which allows a sufficient volume of air to enter the interface between the media and the head and a diverging channel which allows the air to be bled off.

7 Claims, 11 Drawing Figures

LONGITUDINAL SCAN, CAM SHAPED, TURNTABLE ROTOR FOR MAGNETIC RECORDING

BACKGROUND OF THE INVENTION

1. Field of Invention

The present invention relates to rotating head magnetic tape recorders. More particularly, the invention relates to turntable type recorders where the magnetic transducer is positioned on the turntable and a length of magnetic media is positioned relatively and traversely so that the transducer reads or writes data into arcuately shaped record tracks on said media.

2. Prior Art

Longitudinally scanned rotating head recorders are well known in the prior art. Generally this type of recorder includes a plurality of recording magnetic heads which are mounted for rotation upon a disc wheel or the like. The magnetic heads are equally spaced angularly from one another about the periphery of the disc and are rotated in a common plane about a common axis. A feed mechanism is adapted to feed a length of recording media past the rotating heads in a plane parallel to the plane of rotation of the heads and in transducing relation with said heads. As a result, recording and/or reproduction is effected in a series of arcuate tracks positioned across the width of said media. A more detailed discussion of this general type of recorder is given in U.S. Pat. Nos. 3,258,269 and 2,924,668.

Although this type of prior art recorders function satisfactorily for their intended purpose, they are beset with several problems and limitations which render them unsatisfactory for use in conventional high density magnetic recording technology.

One of the problems associated with this type of device is unusual head and/or media wear which increases the frequency at which these items are replaced. The unusual head wear stems from the fact that the prior art recorders are characterized by contact recordings (i.e., the transducing head is always in contact with the media). As is well known to those skilled in the art, with contact recording the useful life of the involved components (transducers and/or media) are significantly reduced. As a result, the cost of operating these devices is relatively high.

Even in a design where the head and/or media is not always in contact, the wear problem is still present. As was discussed above, in order to transduce (i.e., read and/or write) arcuate tracks on the media the magnetic heads enter under the media at one point and exit the media at another point. The magnetic heads protrude above the surface of the positioning disc and, as such, contact or nick the media as it enters and exits the media.

Due to the unusual head wear of the prior art device, the field of use is limited. Generally, the prior art longitudinally scanned recorders are used for processing video information. As is well known to those skilled in the art, video recording is generally low density recording. With low density recording, the relative speed between the rotating heads and media is relatively low. At the relatively low speed, although the magnetic heads are in contact with the media, head and/or media wear are kept within tolerable limits. Of course, the usefull life of the heads and media (i.e. the period over which the elements may be used for recording) would be extended if the prior art devices were capable of non contact operation.

However, any attempt to extend the use of the prior art device to perform conventional high speed recording is doomed since the wear problem is intolerable. As is well known to those skilled in the art, in conventional high speed recording the relative motion between the head and media is approximately 200 inches per sec. At this speed the drag force between the media and head is relatively high should they operate in contact which would significantly augment the head and/or tape wear. As a result, the prior art devices are not suitable for conventional high speed recording.

SUMMARY OF THE INVENTION

The present invention overcomes the enumerated prior art problems by mechanically designing the tape path to allow the media to fly relative to the magnetic transducer and the supporting turn table rotor.

The tape path includes an advance reel and a rewind reel positioned at the beginning and end of the tape path. A turntable rotor, carrying magnetic transducers, is positioned intermediate to said reels. The rotor has a transducing interface characterized by a cam shaped contour surface with the magnetic transducer seated on the peak of said cam shaped surface.

In one feature of the invention there is a gradual roll off or slope (i.e. difference in height) between the peak and remaining portion of said surface. As a result of this rolloff there is a converging channel between the low point on the rotor and the magnetic transducer and a diverging channel between the magnetic transducer and the low point on the rotor.

In still another feature of the invention, the transducing plane in which the magnetic media is placed, is defined by a hydrodynamic air bearing and an off centered tape lifter operating in concert with an idler roller to establish a stable platform which is parallel to the surface of the rotor. Stated another way, the transducing platform is parallel or coplanar to the plane of rotation of the magnetic transducer.

The foregoing and other features and advantages of the invention will be apparent from the following more particular description of preferred embodiments of the invention, as illustrated in the accompanying drawings.

DETAILED DESCRIPTION OF THE PREFERRED EMBODIMENT

Figure 1:
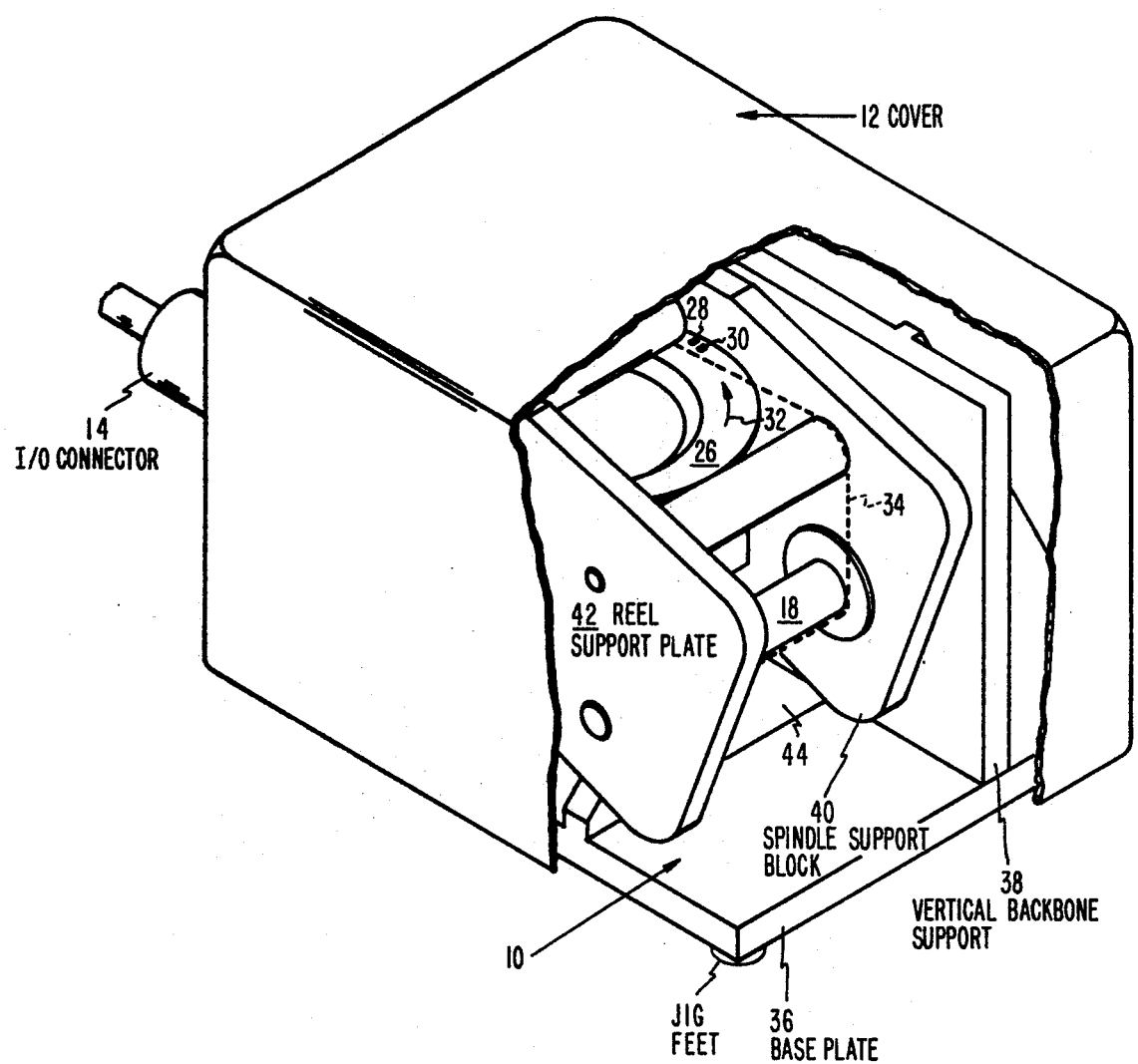
FIG. 1 shows a pictorial view of the tape recorder embodying the present invention with sections of the cover removed to show the internal parts of the machine.

Referring now to FIG. 1, a pictorial view of the tape recorder embodying the present invention is shown. The tape recorder comprises a support mechanism or frame 10, a cover section 12, and I/O connector 14. I/O connector 14 is the conduit whereby electrical energy, signals, etc. enters and exits the unit. Cover portion 12 protects the unit from dust and other foreign material. It is also possible to fabricate cover 12 so that if forms an air tight cover about the recorder.

Still referring to FIG. 1, frame 10 has two primary functions. It supports tape reels 16 and 18, (FIG. 2) idler roller 20, lift mechanism 22 and provides a support housing for rotor assembly 24. As will be explained subsequently, rotor assembly 24 comprises a plurality of elements: namely, rotor 26 with magnetic transducers 28 and 30 thereon. Rotor 26 is rotated in the direction shown by arrow 32 to transduce (that is read or write) data on magnetic media 34 which is positioned relative to the transducers.

Frame 10 incorporates a base plate 36 to which four jig feet are attached. Only one of these jig feet is shown in FIG. 1, the other three are connected to the other three corners of the device. The jig feet operate to support the overall weight of the mechanism. Attached to the base plate 36 is a vertical backbone support 38. Attached to the vertical backbone is a spindle support block 40. Spindle support block 40 supports one end of the tape reels, lift roller and idler roller, while the other ends are supported by reel support plate 42 which is positioned parallel and in spaced relationship with the spindle support block. Reel support plate 42 is attached to two support blocks, one at each end 44 and 46 respectively. Only support block 44 is shown in FIG. 1. Support blocks 44 and 46 are gusseted to base plate 36, thereby forming a uniform and vibration free support structure. Spindle support block 40 and reel support plate 42 are connected together by rotor motor housing (not shown). The rotor motor housing is fabricated with a hole so as to contain rotor assembly 24 (FIG. 2).

Figure 2:
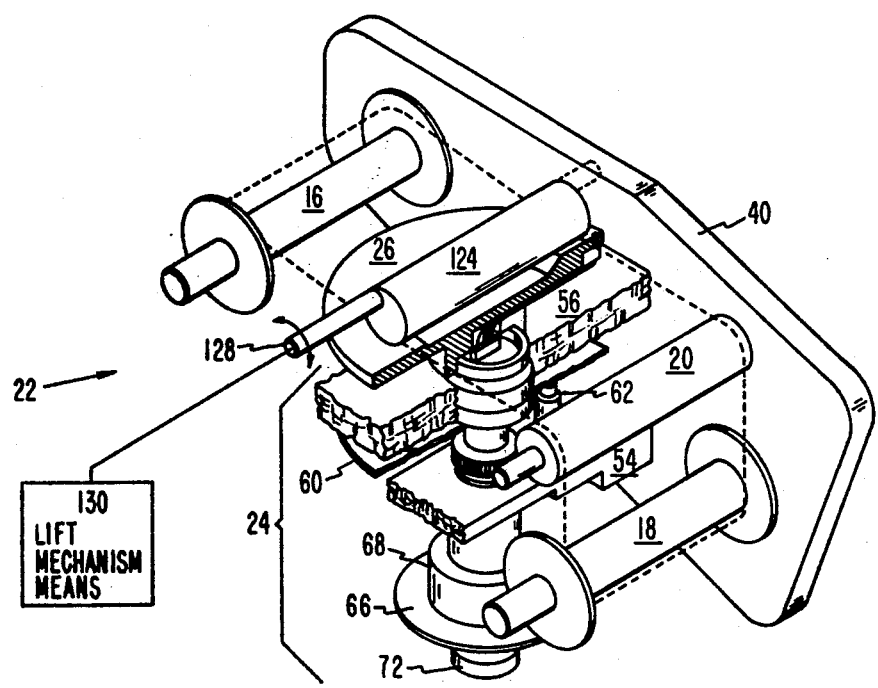
FIG. 2 shows a view of the tape recorder with mechanical components which define the tape path.
Figure 4:
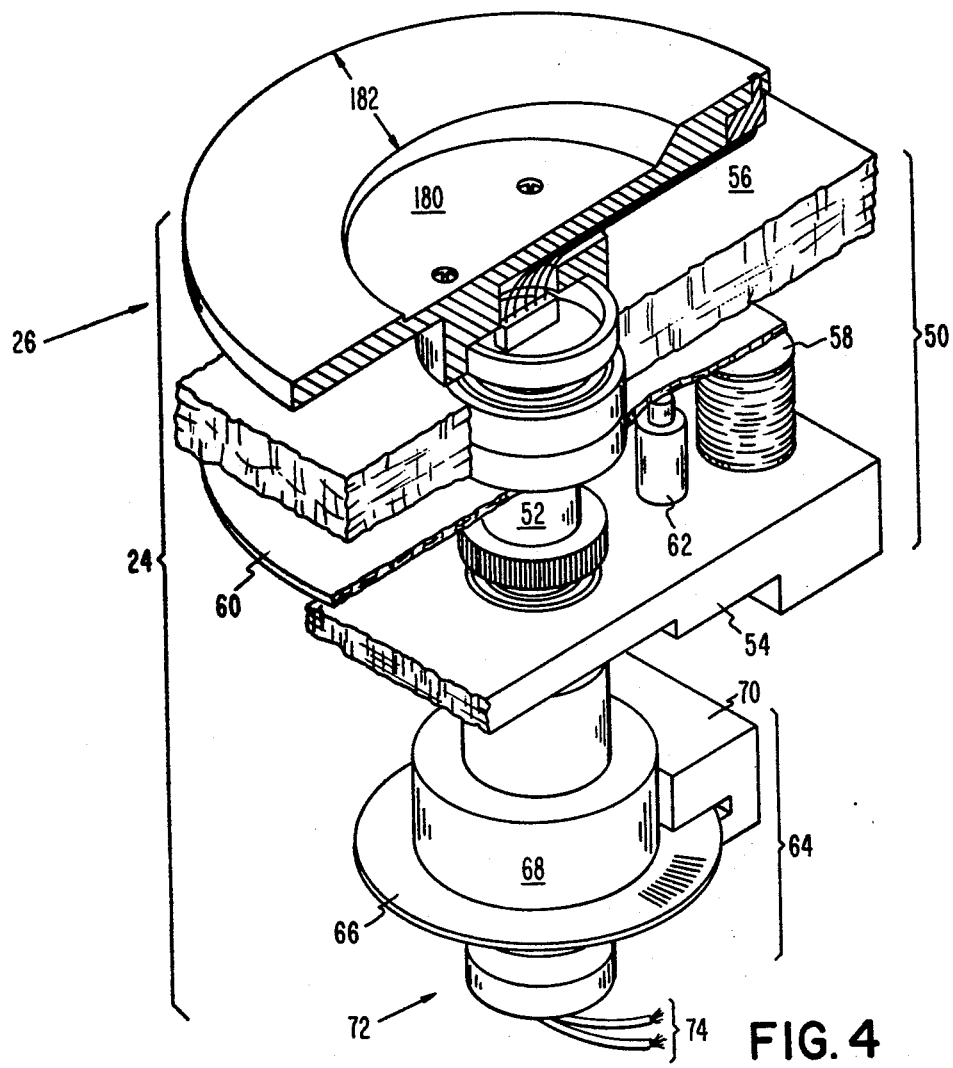
FIG. 4 is a vertical view of the tape recorder showing the head wheel or rotor motor which rotates the rotor and tachometer assembly.

With reference to FIGS. 1, 2 and 4 and from the above discussion, the structure which supports the critical elements of the tape transport unit is substantially H-shaped. The two legs of the H, that is reel support plate 42 and spindle support block 40, support the ends of the lift roller and its attached lift mechanism, idler roller 20 and tape reels 16 and 18 respectively. The central portion of the H, that is the rotor motor housing has the hole which supports rotor assembly 24. Of course it is within the skill of the art to design a plurality of frames which are within the scope of the present invention.

Referring now to FIGS. 2 and 4, a view of rotor assembly 24 and the mechanical components which define the tape path are shown. In order to show the mechanical components more clearly, reel support plate 42 is removed. As can be seen from these figures, the tape transport is a reel to reel system. As used in this application, reel to reel system means one in which there is no vacuum source position in the tape path.

Referring now to FIG. 4, rotor assembly 24 is shown in more detail. Rotor assembly 24 comprises a constant drive DC motor 50. DC motor 50 is a conventional constant speed motor which rotates head wheel 26 at constant rotational speed. Constant drive motor 50 includes a shaft 52 which extends above and below motor support plate 54. Constant drive DC motor 50 is a conventional DC motor and will not be described in detail. Suffice it to say that the motor includes a housing 56 which functions as a magnetic return path and a permanent magnet 58 which is connected to motor support plate 54. Still referring to FIG. 4, motor housing 56 and magnet 58 is positioned in space relationship to form an air gap within which flat or pancake armature 60 carrying electrical conductors rotates. Magnetic brush 62 is attached to motor support plate 54 and contact armature 60. Rotor 26 is attached to the extended shaft of constant drive DC motor 58. Position on motor shaft 52 is tachometer assembly 64. Tachometer assembly 64 is operable and output signal which is used to determine the speed of rotor 26 and the position of magnetic transducer 28 and 30 (FIG. 1) at any point about its orbit. Tachometer assembly 64 includes an optical disk 66. The disk comprises a plurality of dark and light patterns. The disk is attached to hub 68 and hub 68 is operably connected to shaft 52. Tachometer assembly 64 further includes tachometer block 70. Tachometer block 70 has a light emitting source and a light receiving source (not shown). As tachometer disk 66 rotates between the light emitting and light receiving source an interference pattern is set up from which pulses are outputted signifying speed of rotation and position of the magnetic head. Positioned on the shaft of the motor is rotor transformer 72. The rotor transformer 72 transmits signals via conductors 74 to and from the rotating head. As is shown more clearly in FIG. 5, rotor transformer 72 comprises a fixed portion 76 and a rotatable portion 78. Signal transfer is effectuated by the inductive characteristics of the transformer.

Figure 5:
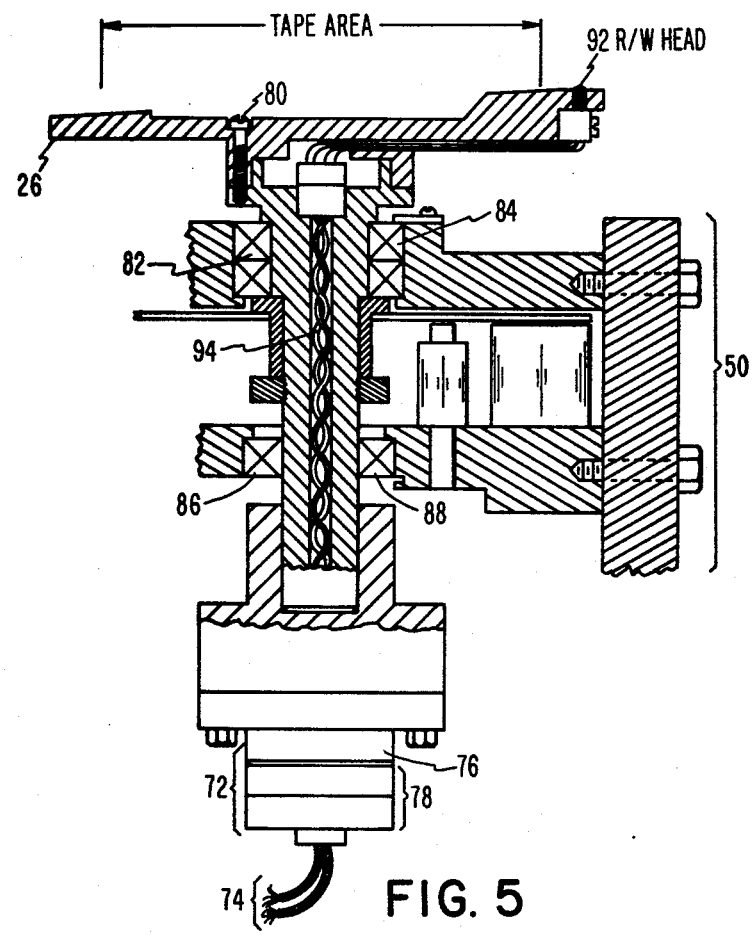
FIG. 5 is a vertical section through FIG. 4.

Referring now to FIG. 5 a cross section taken vertically through rotor assembly 24 is shown. As was stated previously, rotor assembly 24 is an integrated unit comprising rotary transformer 72 which transfers signals from external source to the tape transport unit. Rotor 26 is fastened by fastening means 80, only one of which is shown, to the rotor assembly. The assembly is driven by constant drive DC motor 50. As was stated previously, this motor is a constant drive conventional motor which can be servo controlled. The assembly is attached to the motor shaft for rotation by a pair of duplex bearings 82, 84 and single bearing 86, 88 respectively. Still referring to FIG. 5, the width of the media (that is the tape area) which is positioned relative to the rotor is somewhat less than the width of rotor 26. Positioned on the surface of the rotor which interfaces the media is a hole (not shown) and read/write head 92. An erase head is also positioned relative to the read/write head. However, in FIG. 5 the erase head is not shown. The hole is positioned relative to the heads so that it precedes the head in the clockwise direction of rotation. A photodetector/light emitting assembly outputs signals which signifies the position of the heads relative to the media. The signals are used for track following or servo control of read/write head 92. Since the servoing of the device does not form part of the present invention, it will not be discussed in detail. Suffice it to say that the photodetector/light emitting assembly is positioned on the fixed frame of the tape transport unit. Light from the light emitting source of the assembly is incident through the hole, reflected by the media onto the photodetector. Attached to the photodetector is appropriate motion control circuits which control the positioning of the head relative to a selected data track. Signals to and from read/write head 92 are transmitted via conductor 94.

Figure 3:
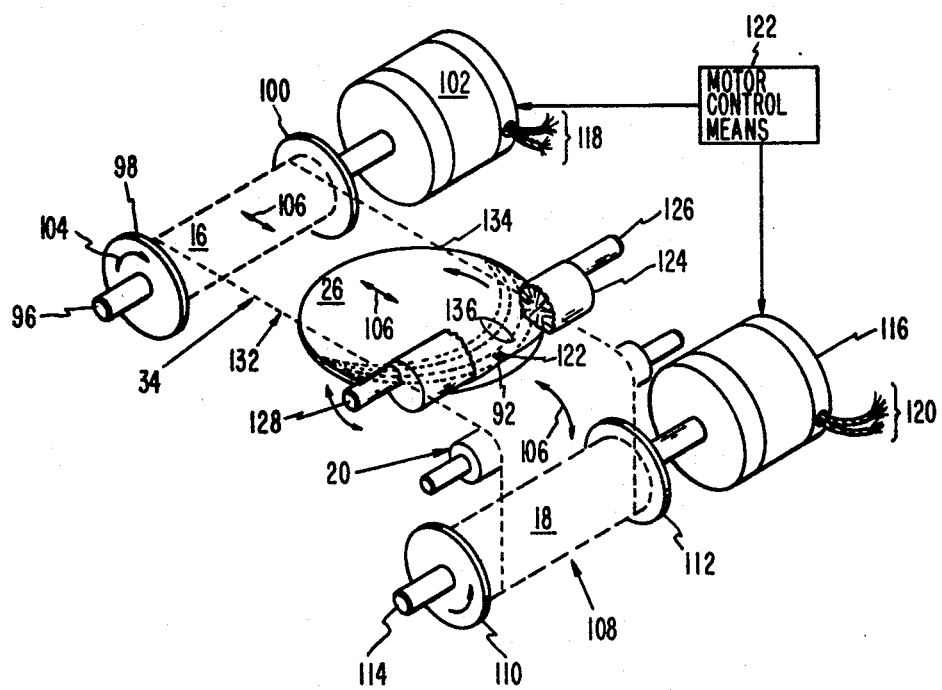
FIG. 3 shows the tape path with media, means for positioning the media relative to the transducing heads, and means for transporting the media.

Referring now to FIG. 3, the tape path with media and means for positioning the media relative to the head is shown. Basically the tape path is a reel to reel system which includes the tape reel 16 and 18. Tape reel 16 is hereafter called the payout reel while tape reel 18 is hereafter called the takeup spool. Payout reel 16 comprises a hub portion, shaft 96, and flanges 98 and 100 respectively. The flanges are used for guiding the tape or media 34. In the preferred embodiment of the invention, flanges 98 and 100 are attached to the frame of the device. Shaft 96 of payout reel 16 is coupled to conventional DC servo control motor 102. As DC motor 102 rotates payout reel 16 in the direction shown by arrow 104, media 34 is transported in the direction shown by arrow 106. Likewise, takeup spool 18 includes hub portion 108 with flanges 110 and 112 respectively. As in the case of payout reel 16, flanges 110 and 112 are used for guiding the tape. In the preferred embodiment of this invention, these flanges are also connected to the frame of the device. Hub 108 is positioned about shaft 114 and shaft 114 is driven by conventional DC servo control motor 116. Power to the motors is supplied by conductors 118 and 120 respectively.

The DC motors 102 and 116 are controlled by motor control means 122. The motors are controlled so that the tension in media 34 is constant. The tape is also transported past read/write head 92 and erase head 122 at various rates of speed. For example, when the tape is transported in the so-called high speed mode (forward and/or reverse) the speed of the tape relative to the head is approximately 180 to 200 inches per second. The high speed mode is generally used for rewinding and/or searching. In the so called normal read/write speed the tape is stepped from track to track. In this mode the magnetic transducers are in transducing relationship with the media. In the so-called slew mode the magnetic transducers are in transducing relationship with the media. However, the media is not at rest, that is standing, while the head is transducing a selected track. Instead, the media is in motion and its speed is substantially less than the speed at which head wheel 26 is rotating the read/write heads.

Motor control means 122 controls motor 102 and 116 so as to compensate for the inertial change which is experienced on pay out reel 16 and take up spool 18 as the radius of the media changes. A plurality of motor control means can be designed to control motors 102 and 116 to perform according to the enumerated functions. This being the case, the details of motor control means 122 will not be given in this application.

Figure 8:
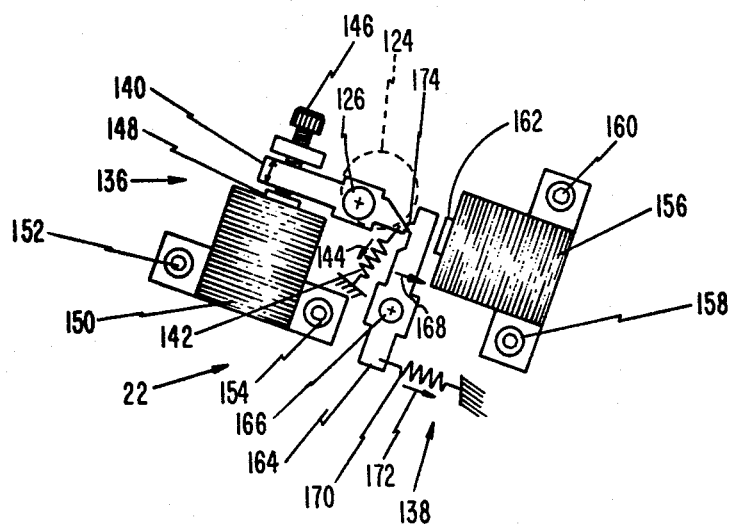
FIG. 8 shows the lift mechanism which rotates the positioning means disclosed in FIG. 3.

Still referring to FIG. 3, the media 34 is threaded above and in contact with idler roll 20, under cam roll 124 and over rotor 26 which carries the read/write and erase head to payout reel 16. Roller 20 includes a hub portion and a shaft. The shaft is connected to bearing support means in spindle support block 40 and reel support plate 42 (See FIG. 1 and FIG. 2). Idler roll 20 rotates freely by means of the media which is in contact with its hub surface. Cam roll 124 is eccentric (that is the hub portion off center) about its shaft 126. One end of shaft 126 is connected to a bearing support housing (not shown) which is attached to spindle support block 40. The bearing support housing allows a degree of movement in the direction shown by arrow 128. The degree of motion is approximately 4°. The other end of shaft 126 is connected to lift mechanism means 130 (FIG. 2). The details of lift mechanism means 130 is shown in FIG. 8 and will be discussed in more detail hereinafter. Suffice it to say that under normal operating conditions lift mechanism means 130 positions cam roller 124 to bring the tape in transducing relationship with the magnetic heads positioned on rotor 26. By activating the latching mechanism of lift mechanism means 130, cam roll 124 is rotated approximately 4° in the direction shown by arrow 128. The rotating action either increases or decreases the relative distance between the transducing head and the media. Stated another way, when cam roll 124 is rotated by the latching means of the lift mechanism, media 34 is either positioned in or removed from transducing relationship with the head. Generally, the non transducing position is induced when the tape is in the high speed mode or prior to start up or stopping the tape transport unit.

Still referring to FIG. 3, cam roller 124, together with its lift mechanism and idler roller 20 function in cooperation with media 34 to define the transducing plane. Under the control of the cam and the idler roller, the tape 34 is positioned to define a transducing plane which is horizontal to the plane of rotation of rotor 26. Media 34 is conventional magnetic media which consists of chrome dioxide particles or any other conventional magnetic particles. Although media 34 may have various width, in the preferred embodiment of this invention the width of media 34 is chosen to be approximately 2.7 inches. As can be seen more clearly in FIG. 5, the media is narrower than the width of rotor 26. This being the case, as head wheel 26 is driven at constant speed by the head wheel motor, the transducing head (be it erase and/or read/write head) enters the tape at one edge of the media, for example, at edge 132 and exits the media at edge 134. This being the case, as the head rotates about its orbit (that is in transducing relationship) it is under media 34 for a period of time and not under media 34 for the remaining portion of its orbit. It is during that period of time when the head is under media 34 that data is transduced (read and/or write) in arcuate tracks 136 on the media. Although the spacing of the track may vary with design choice, in the preferred embodiment of the present invention the tracks have a spacing of approximately 0.020 inches. Also, rotor 26 is rotated by its head motor at a constant speed of approximately 3600 RPM. The motor is such that it has more than one speed. However, once a speed is selected that speed remains constant. Data is transduced, that is read and or written at the rate of approximately 400,000 bytes/sec. Of course, the above figures can be changed by one skilled in the art without departing from the scope of this invention.

Referring to FIG. 8, for a moment, lift mechanism 22 together with the end view of cam roller 124 and eccentric shaft 126 is shown. When shaft 126 is rotated (approximately 4° by lift mechanism 22) cam roller 124 positions media 34 to define a transducing plane which is perpendicular to the axis of rotation of the head wheel or remove media 34 from transducing relationship with the magnetic transducer positioned on the head wheel. Stated another way, by rotating cam roller 124 (approximately 4°,) media 34 moves in a direction towards or away from the magnetic transducer. Stated still another way, by rotating cam roller 124, media 34 is translated i.e., positioned towards the transducer or is positioned away from the transducer. The rotation of cam roll 124 is achieved by lift mechanism 22. Lift mechanism 22 comprises first lift latch 136 and second lift latch 138. The first lift latch incorporates first spring loaded lever 140. The first spring loaded lever 140 is pivotally mounted to the center point of shaft 126. One end of the first spring loaded lever 140 has a rectangular shape while the other end has an acute angular shape with two notches. As will be explained subsequently, each of the notches on the acute end of the first spring loaded lever 140 operates to lock cam roller 124 so as to position media 34 in transducing relationship with the magnetic transducer, or to lock cam roller 124 so as to remove media 34 from transducing relationship with the magnetic transducer.

Still referring to FIG. 8, spring 142 connects the acute end of the first spring loaded lever 140 to a fixed point. The spring is biased in the direction shown by arrow 144. The rectangular end of the first spring loaded lever 140 is connected to adjustment means 146. Adjustment means 146 includes a screw and a washer assembly and is used for adjusting the relative position between cam roll 124 and media 34. For example, by torquing the adjustment means in one direction cam roll 124 forces media 34 into transducing relationship with the transducer. Likewise, by torquing the adjustment means in the opposite direction the media is removed from the transducer. Magnetic keeper 148 is attached to coil form 150 and is connected to reel support plate 42 (FIG. 1) by fastening means 152 and 154 respectively. The combination (i.e., magnetic keeper and coil) can be adjusted to control the spacing between the magnetic keeper and first spring loaded level 140.

Still referring to FIG. 8, second lift latch 138 incorporates elements substantially identical with those described for first lift latch 136. Essentially these elements include a second coil form 156 which is connected to reel support plate 42 by fastening means 158 and 160 respectively. Magnetic keeper 162 is attached to coil form 156. By passing a current through second coil form 156 a magnetic field is established in magnetic keeper 162. This field is sufficiently strong to attract second spring loaded lever 164 which is pivotally mounted on point 166 by activating second coil form 156. Second spring loaded lever 164 is transported in the direction shown by arrow 168. This motion releases the latch which is formed by first spring loaded lever 140 and second spring loaded lever 164. One end of second spring loaded lever 164 is connected to second spring means 170. The spring is normally biased in the direction shown by arrow 172. The other end of second spring loaded lever 164 has notch 174 which protrudes above the surface of second spring loaded lever 164. Notch 174 in cooperation with first spring loaded lever 140 enables the mechanism to latch media 34 into two latching positions. One of the latching positions depicts the condition when the media is in transducing relationship with the magnetic transducer, while the other latching position depicts the condition when the media is out of transducing relationship with the magnetic transducer. In FIG. 8, one of the latching positions is demonstrated. Here, first spring loaded lever 140 is positioned under notch 174. In the second latching position (not shown) first spring loaded lever 140 is positioned above notch 174. As is shown in FIG. 8, the lift mechanism is in one of its latching states. In this state, cam roller 124 is in contact with one surface of media 134 while the other surface of media 134 is in transducing relationship with the magnetic transducer. In this position, first spring loaded lever 140 and second spring loaded lever 164 are latched together under the influence of the tension in first spring means 142 and second spring means 170. In order to release the latch and remove media 34 in a plane perpendicular or vertical to the transducing plane, a current is passed through second coil form 156. This current activates second magnet keeper 162 which pulls second spring loaded lever 164 in the direction shown by arrow 168 and out of contact with the first spring loaded lever 140. A current is then passed through first coil form 150 which activates first magnetic keeper 148. The magnetic force which is emanated from the magnet attracts first spring loaded lever 140 and pivots said lever about its pivotal point in a counterclockwise direction. Since the acute end of first spring loaded lever is free to rotate counterclockwise, the low section of cam roller 124 is now in contact with the tape and the transducing surface of the tape is no longer in transducing relationship with magnetic transducer. At this point, the current in second coil 156 is now discontinued. Second spring loaded lever returns to its original position in a direction opposite to arrow 168. The current is then released from the first coil means 150 and first spring loaded lever 140 returns to its original position and latches against second spring loaded lever 164. This position occurs with first spring loaded lever means 140 sitting above notch 174. In this second latching position, the media is positioned in a non transducing relationship with the magnetic transducer.

As is evident from the above description, lift mechanism 22 requires a minimum amount of current for satisfactory operation. As a result the overall power requirement of the tape transport is significantly reduced. The low current characteristics stem from the fact that when the magnet is in its normal state it is electrically passive. This means that no current is drawn from the power source. The magnet is in its normal state when the media is in transducing relationship with the transducer and when the media is not in transducing relationship with the media. Current is only needed to pulse the coil of the magnet so that it can change from one state to the next.

Referring again to FIG. 3, the transducing means incorporates a read/write head 92 and an erase head 122. Although a plurality of magnetic transducers can be used by one skilled in the art without departing from the scope of this invention, the magnetic transducer which is used in the present invention includes a transducer having a spherical transducing interface with a transducing gap and bleed slots positioned on each side of the transducing gap and perpendicular to said gap. A more detailed discussion of the preferred magnetic transducer is given in U.S. Pat. No. 3,961,372 issued to W. Brock, et al and assigned to the assignee of the present invention. The magnetic transducer is seated on rotor 26.

Figure 7A:
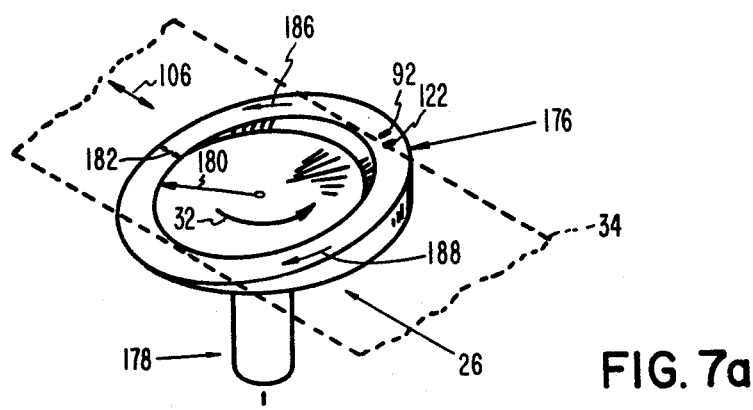
FIG. 7A is a pictorial view of the rotor.
Figure 7B:
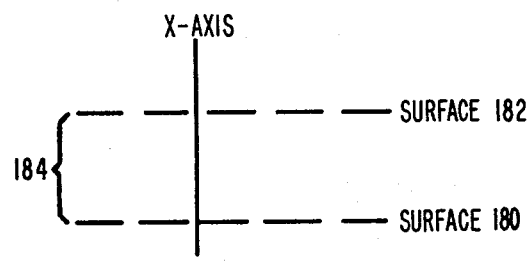
FIG. 7B shows a graphical separation between the highest point on surface 182 and a point on surface 180.

FIG. 7A depicts a pictorial view of rotor 26. Rotor 26 includes a substantially circular turntable 176 with stem portion 178. Stem portion 178 is joined to the turntable section. By attaching the stem portion of rotor 26 to the shaft of the rotor motor, rotor 26 is rotated while media 34 is transported in a horizontal path shown by arrow 106. The turntable portion 176 includes concentric surfaces 180 and 182 respectively. Concentric surfaces 180 and 182 are in non continuous planes with concentric surface 180 positioned in the lower plane while concentric surface 182 is positioned in a higher plane. Stated another way, concentric surfaces 180 and 182 are positioned in separate but horizontal planes and skew relative to one another. FIG. 7B depicts a graphical relationship between surfaces 180 and 182 with vertical distance 184 along the axis X separating the surfaces. The distance 184 is taken between the highest point (that is the head region) on surface 182 and surface 180, respectively. Of course, this representation is exaggerated since in reality the difference between the surfaces is approximately 0.03 inches. However, FIG. 7B is helpful in understanding the relationship between the two surfaces. As is shown in the figure, surface 182 is separated from surface 180 at the highest point by vertical distance 184. The lower surface, that is surface 180 helps to define the transducing plane in which the tape is positioned by cam roller 124. Surface 182 is cam shaped with cross radius and has a roll off or slope in the direction shown by arrows 186 and 188 respectively in the region of the surface that supports the magnetic head. Stated another way, surface 182, in the vicinity of the magnetic head region, is arcuately shaped in direction 186 and 188 respectively with a cross radius across the width of surface 182. In the preferred embodiment of this invention, the roll off was approximately 0.01 inches. Stated another way, magnetic transducers 92 and 122 are positioned at the apex or highest point of cam shaped surface 182. By designing surface 182 with a cam shape and by positioning or seating the magnetic transducer on the highest point of the cam, a low point precedes the head as it enters under media 34 and a low point follows the head as it exits the media. This prevents the head from nicking the media as it enters and exits from under the media which, in turn, significantly reduces wear between the media and the tape. In addition to solving the nicking problem between the head and the tape, the design further allows for the development or generation of an adequate hydrodynamic air film which interfaces between the media and the head as the head transduces data from the magnetic media. Stated another way, the head flies relative to the media. The rotor is also separated from the media by the hydrodynamic air film.

Figure 7C:
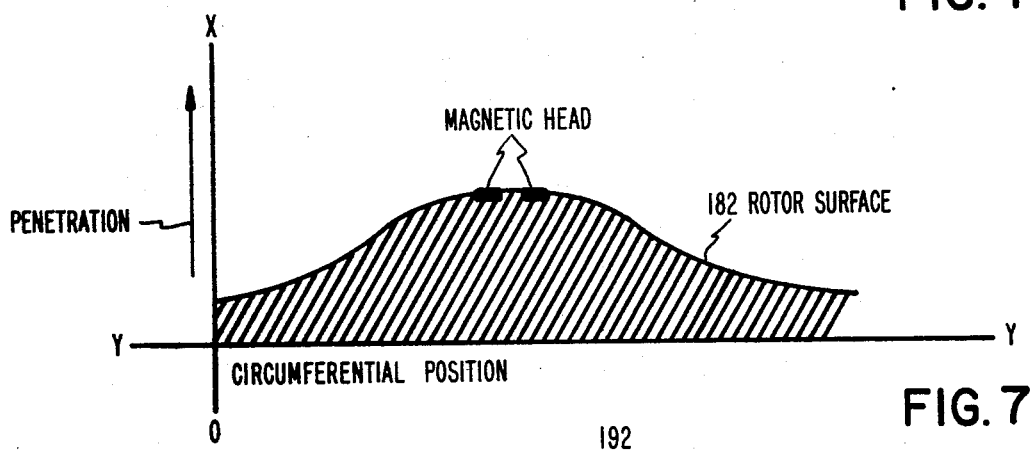
FIG. 7C is a section taken on an approximate circle through the heads. The section shows the surface of the rotor and its penetration into the media.

FIG. 7C shows a schematic between rotor head penetration and circumferential position of the head. This schematic is helpful in understanding the present invention. Coordinate X represents head penetration while coordinate Y represents the circumferential position of the rotor. As can be seen from the sketch, the highest point of penetration is where the magnetic head is positioned on the rotor. Of course, this point is the peak of the cam shaped surface. The sketch also shows that rotor surface 182 has various penetration relative to the media as one progresses about its circumference. This design allows a gradual convergence of the dynamic air film which precedes the head and a gradual divergence of the air film which follows the head. The convergence/divergence provides for proper air film generation and reduces head and tape wear.

Figure 6:
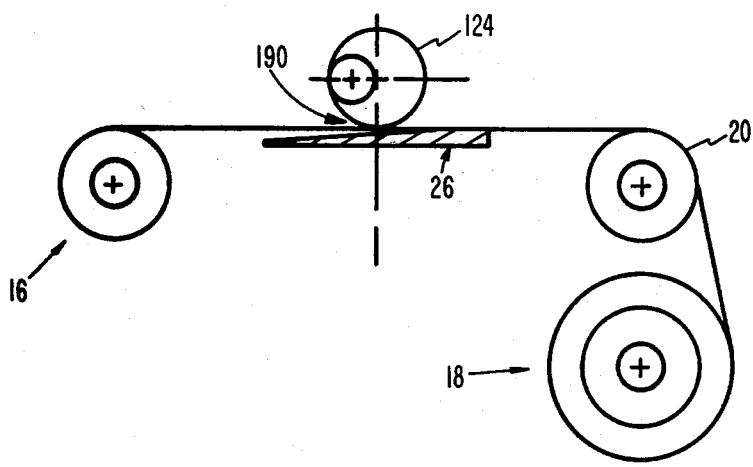
FIG. 6 depicts side view schematic of the tape path with a cross section of the rotor and is helpful in understanding the invention.

Referring now to FIG. 6, an end view of the tape path is shown. Payout reel 16, cam roll 124 and idle roller 20 is positioned so that payout reel 16 is higher than cam roll 124. Cam roll 124, at its down position, and idle roller 20 form a horizontal plane or transducing platform for the media. The rotor center line coincides with the center line through cam surface 124. A cross section of rotor 26 is shown in FIG. 6. The cross section taken across rotor 26 is an exaggerated view which shows the difference in height, that is the roll off between the highest point of the cam shaped surface and the lowest point of rotor 26. It is easily seen from this figure that as latching mechanism 22 rotates cam roller 124 in the direction shown by arrow 190 the tape is lifted and allowed to rise above the transducing plane and out of transducing relationship with the magnetic head. Alternately, as cam roller 124 rotates in the direction opposite arrow 190 (that is clockwise) the tape is forced into transducing position with the transducing gap. Takeup spool 18 is positioned in a plane non-continuous with the plane defined by the other elements in the tape path.

Figure 9:
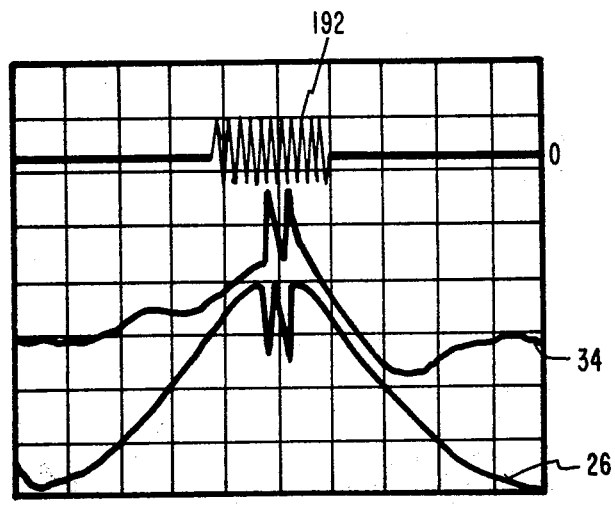
FIG. 9 is a trace showing the symmetrical output signal and the relationship between the media and the rotor with its transducing head.

Referring now to FIG. 9, a CRT trace showing the relationship between magnetic media 34, rotor surface 26 and the output signal 192 which is derived from the media is shown. The trace in FIG. 9 is obtained by positioning a capacitive probe relative to the rotor media interface and interconnecting the probe to a CRT oscilloscope. As can be seen from this sketch, the output signal envelope 192 is substantially symmetrical about center point zero. This means that the circuit which is necessary to process the output signal is simple. Also, the separation between the magnetic head and the media is substantially symmetrical about the head region. Due to the non capacitor characteristics of the magnetic head, the capacitive probe was unable to show the head on the trace of 26. Hence the W shaped waveform configuration is shown in the trace about the head region.

This completes the detailed description of the preferred embodiment of the invention.

OPERATION

The present invention is a magnetic tape transport which includes a turntable type rotor which allows the magnetic transducer which is seated on the rotor to fly relative to a length of magnetic media positioned in a transducing plane substantially parallel to the axis of rotation of the turntable. In the non-operating mode the rotor 26 is at rest. Generally, cam roller 124 is in contact with the tape which may force the tape into the transducing plane. In this position the transducer may or may not be in contact with the surface of the media. In order to bring the machine up to speed so that data can be transduced (that is written or read in the arcuate tracks across the media) lift mechanism 130 rotates cam roller 124 in a counterclockwise direction which lifts the media from the magnetic transducer. The head wheel motor is then energized and after a period of time the head wheel is now rotating at its desired or operative speed. In the preferred embodiment of the present invention the head wheel speed is approximately 3600 RPM. With the head rotating at its desired rate of speed, lift mechanism 30 then rotates cam roller 124 clockwise which brings media 34 into the transducing plane and data is written and/or read on the media. Prior to stopping the tape transport, the media is again lifted out of contact with the transducing head. Whenever it becomes necessary to do a search operation on the media, the lift mechanism is again energized so as to lift the media out of transducing relationship with the transducing heads. Due to the fact that the head is flying relative to the media, the search operation can be accomplished with the head still positioned in transducing relationship with the media. During transducing relationship a hydrodynamic air bearing is generated between the transducing means and the surface of the media which interfaces the transducing means. As a result of the hydrodynamic film the head flys relative to the media.

Although the present invention has been described with reference to preferred embodiments thereof, it will be understood by those skilled in the art that various changes in form and details may be made therein without departing from the spirit and scope of the invention:

What is claimed is:

1. A longitudinally scanned recording device comprising in combination:
    a length of media positioned in a first plane;
    a turntable rotor, said turntable rotor having an axis of rotation substantially perpendicular to the first plane and a transducing surface thereon with an apex, and a sloping profile facing the media;
    transducing means being operably positioned on the apex of said transducing surface;
    transporting means operable to transport said media past the transducing means;
    drive means operable to rotate said transducing means relative to said media whereby an air film is being developed between the transducing means and the media thereby enabling the media to fly relative to the transducing means as data is being transduced into arcuate tracks on said media.

2. The device claimed in claim 1 wherein the turntable rotor includes;
    a first and a second contiguous noncoplaner surface with one of said surfaces forming the transducing interference with said media.

3. A longitudinally scanned tape recorder comprising in combination:
    a turntable rotor, having an apex with a sloping profile and a curved surface thereon, operably mounted on a shaft; said rotor establishing a first rotating plane;
    drive means operably connected for rotating said rotor;
    a length of media operably associated with said rotor and the first rotating plane; said media establishing a second longitudinal plane relative to the rotating plane;
    transducing means being positioned on the apex of said rotor and operable to penetrate said media;
    adjustment means operable to engage said media from a position spaced from the rotor to transpose said media to an operating position immediately adjacent said rotor so that the transducing means transduces data as the transducing means rotates relative to said media;
    an air bearing formed between the media and the rotor; and
    transport means operable to transport said media past said transducing means.

4. The device according to claim 3 where the adjustment means includes:
    a first idler roller having a central hub section and a shaft; said roller being mounted to the frame of said recorder and to support the media;
    a second eccentric roller being mounted to the frame in spaced relationship and downstream from said first roller; and
    lift means for rotating said second eccentric roller into the media or away from the media.

5. The device according to claim 4 where the lift means includes:
    a first lever having a notched end, pivotally mounted to the second eccentric roller;
    first spring bias means operably connected to said lever;
    a second lever having one end with a projection thereon, pivotally mounted on said recorder frame and positioned so that the end with the projection cooperates with said first spring bias lever to form a latch;
    a second spring bias means operably connected to said second lever;
    first control means operably associated to control said first lever, and
    second control means operably associated to control said second lever.

6. The device according to claim 5 where the control means includes a coil means with a magnetic keeper thereon; and
    means for supplying energizing current to said coils.

7. In a longitudinally scanned tape recorder wherein a transducer is positioned on a turntable rotor to transduce data from arcuate tracks positioned on a length of associated magnetic media, the improvement comprising in combination:
    a rotor with a cam shaped surface thereon; said cam shaped surface having an apex with a gradual roll off so that as the transducer enters under the media a gradual convergence in the rotor/tape separation precedes the transducer, as the transducer exits the media a gradual divergence in the rotor/tape separation follows the transducer;
    means for rotating said rotor to pass the media during transducing of data therefrom;
    an air bearing formed between said turntable rotor and the media, said air bearing enabling said media to fly relative to said transducer; and
    a lift means associated with said media and operable to adjust the media from an operating position immediately adjacent the rotor to a position spaced from the rotor.

* * * * *